United States Patent [19]

Moriya et al.

[11] Patent Number: 5,441,076
[45] Date of Patent: Aug. 15, 1995

[54] PROCESSING APPARATUS USING GAS

[75] Inventors: Shuji Moriya, Yamanashi; Takenobu Matsuo; Tsuyoshi Wakabayashi, both of Kofu; Kazutoshi Miura, Tokyo; Takahiro Mori, Sagamihara, all of Japan

[73] Assignees: Tokyo Electron Limited, Tokyo; Tokyo Electron Tohoku Limited, Esashi, both of Japan

[21] Appl. No.: 222,589

[22] Filed: Apr. 4, 1994

Related U.S. Application Data

[63] Continuation-in-part of Ser. No. 164,545, Dec. 10, 1993.

Foreign Application Priority Data

| Dec. 11, 1992 | [JP] | Japan | 4-353287 |
| Dec. 25, 1992 | [JP] | Japan | 4-357986 |
| Dec. 25, 1992 | [JP] | Japan | 4-357987 |
| Apr. 2, 1993 | [JP] | Japan | 5-100229 |

[51] Int. Cl.$^6$ .............................................. G05D 7/06
[52] U.S. Cl. ................................. 137/486; 137/487.5; 137/884
[58] Field of Search ..................... 137/486, 487.5, 884

[56] References Cited

U.S. PATENT DOCUMENTS

| 3,726,296 | 4/1973 | Friedland | 137/487.5 X |
| 4,356,840 | 11/1982 | Friedland | 137/487.5 |
| 4,687,020 | 8/1987 | Doyle | 137/487.5 X |
| 5,062,446 | 11/1991 | Anderson | 137/487.5 X |

Primary Examiner—Robert G. Nilson
Attorney, Agent, or Firm—Oblon, Spivak, McClelland, Maier & Neustadt

[57] ABSTRACT

A vertical heat treatment apparatus includes a heat treatment unit for performing a heat treatment process to a semiconductor wafer using a gas and a gas supply unit for supplying the gas to the heat treatment unit. The gas supply unit includes a plurality of gas controlling instruments having a plurality of gas flow control devices, a gas controlling instruments-storage vessel for storing the instruments, and a plurality of electrical parts arranged outside the storage vessel and belonging to the instruments, and an electrical parts-storage vessel for storing the electrical parts, and the plurality of gas flow control devices are integrated with each other by block-like joints.

21 Claims, 8 Drawing Sheets

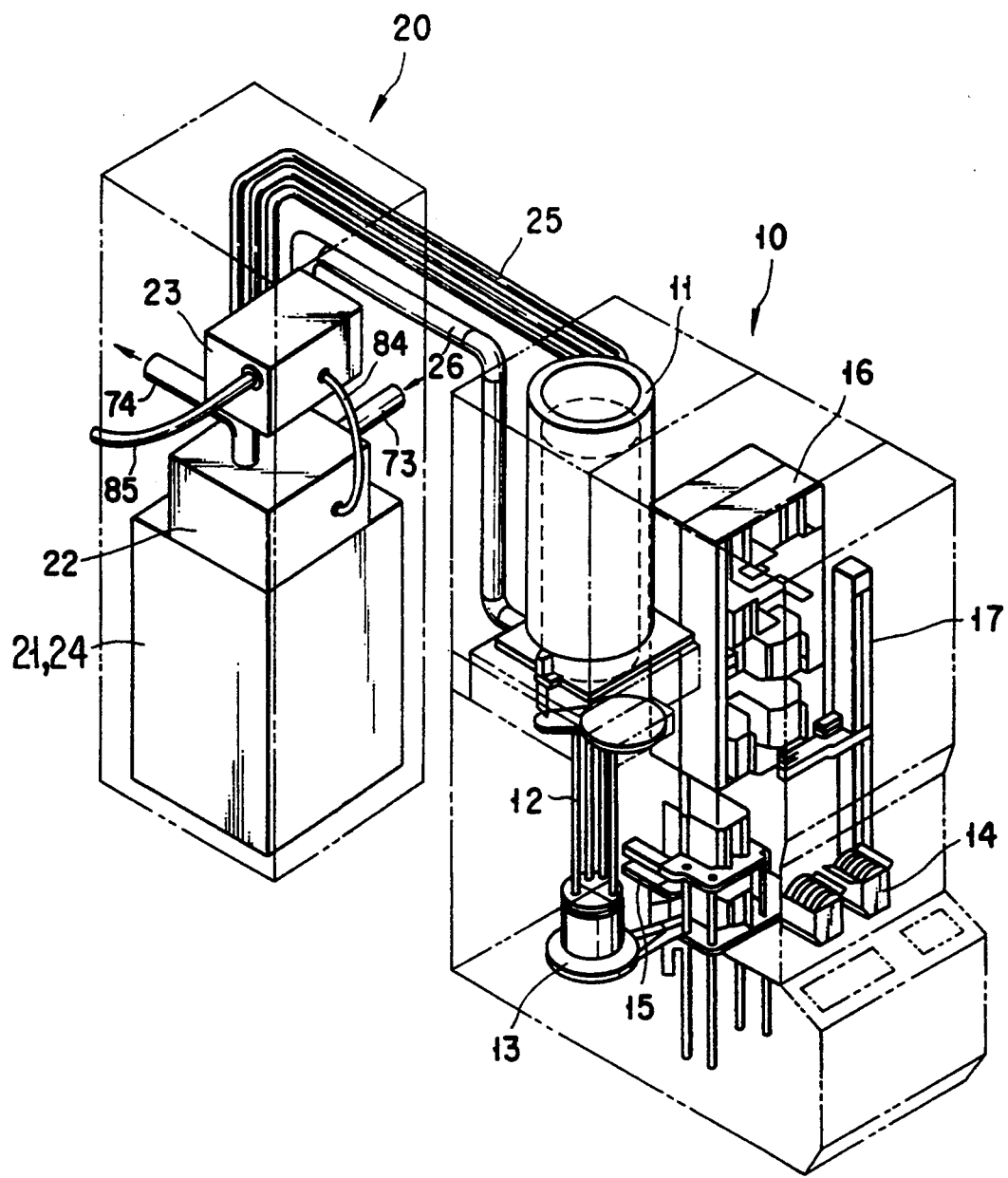
F I G. 1

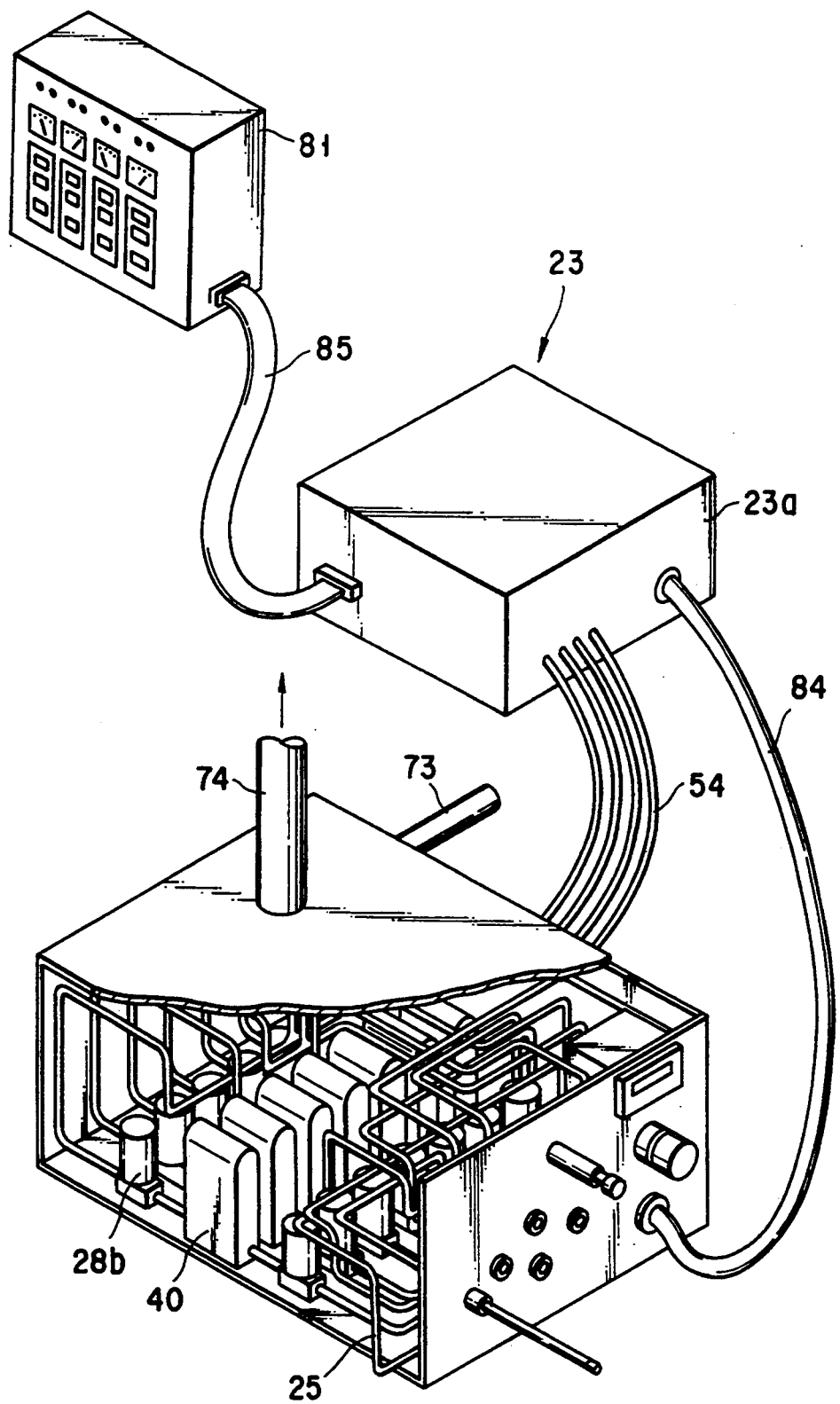
F I G. 3

PROCESSING APPARATUS USING GAS

CROSS-REFERENCE TO THE RELATED APPLICATION

This application is a continuation-in-part of U.S. patent application Ser. No. 08/164,545, filed on Dec. 10, 1993.

BACKGROUND OF THE INVENTION

1. Field of the Invention

The present invention relates to a processing apparatus such as a heat treatment apparatus for a semiconductor wafer using a gas and, more particularly, to a processing apparatus comprising a gas controller unit in which a flow control device for controlling the flow rate of a gas is incorporated.

2. Description of the Related Art

In a factory in which semiconductor wafers are manufactured, a working area is generally divided into a clean room and a maintenance room, a wafer convey system and the like are installed in the clean room, and a gas supply system and an exhaust system in a heat treatment apparatus are installed in the maintenance room. When wafers are subjected to film formation processing or etching processing, highly dangerous gases having a combustion aiding property, combustibility, and toxicity are used. For this reason, gas bombs are installed outside the working area, and the gases are supplied from the gas bombs into the reaction tube of the processing apparatus through a gas piping in the maintenance room.

On the other hand, in recent semiconductor manufacturing equipment, the number of processes increases, and the processes are complicated. For this reason, an entire system has a tendency to be made compact, and a gas controller unit constituted by integrating instruments for controlling gas in a unit to obtain a compact gas supply system, facilitate maintenance, and obtain a general-purpose system is considered. In addition, the followings are also considered. That is, this gas controller unit is installed to be integrated with an exhaust unit adjacent to, e.g., a heat treatment furnace, and the gas control unit is arranged above the heat treatment furnace.

This gas controller unit has filters, pressure switches, mass-flow controllers (flow control devices), blocking valves, check valves, and openable valves which are integrated and stored in a casing. An air supply pipe and an exhaust pipe are connected to the casing to circulate, e.g., air, in the casing, thereby preventing leakage of a gas from the unit into the maintenance room. In addition, this gas controller unit has a complex three-dimensional structure having a plurality of piping systems to cope with various heat treatment processes.

The above mass-flow controller comprises a flow-rate detection sensor for detecting a gas flow rate, a gas flow adjustment mechanism, and a control mechanism for controlling the gas flow adjustment mechanism in accordance with a flow-rate detection signal from the flow-rate detection sensor. Since the mass-flow controller serves as the principal part of the gas controller unit, the mass-flow controller must be periodically subjected to inspection and maintenance more frequently than other machines.

However, in a conventional mass-flow controller, since gas supply pipes are directly connected to an inlet and an outlet for a gas, the degree of freedom of piping is low, and only a planar piping structure is obtained. For this reason, a reduction in size of the gas controller unit is limited, and the gas controller unit has a considerably large size. Therefore, when maintenance of controllers on a processing vessel side is considered, the gas controller unit must be installed at a position having a long distance from the processing vessel, and an area occupied by the entire processing apparatus increases.

In addition, electrical parts such as electrical contacts, integrated circuits, and connector portions are preset in the gas controller unit. For example, some pressure switch has an output function for a pressure signal and a switching function and this pressure switch has a signal output circuit, a microswitch, a relay, and the like. The mass-flow controller has a processing circuit for outputting a flow control signal in accordance with a flow-rate detection value. The blocking valve has a solenoid valve for supplying air used for a blocking operation. Therefore, when a combustible gas leaks from the connection portion between, e.g., the gas controller and a piping, the leakage gas is exhausted from an exhaust duct because air is circulated in the casing of the gas controller unit. However, an explosion area concentration may be partially formed. Under this circumstance, when sparks are produced from the contact of the pressure switch, the contact of the solenoid valve for controlling the air of the blocking valve, or a defective connection of the electrical circuit, a small explosion may occur in the worst case. In addition, even when no combustible gas leaks, when a gas such as an oxygen gas having a combustion aiding property leaks, firing may occur from sparks or an overheated portion. When the small explosion or firing occurs in the gas controller unit, the piping may be broken, or the gas controllers may be damaged.

SUMMARY OF THE INVENTION

It is the first object of the present invention to provide a processing apparatus using a gas, capable of obtaining a compact gas supply system.

It is the second object of the present invention to provide a processing apparatus using a gas, capable of preventing an accident caused by sparks or the like produced from electrical parts.

According to the first aspect of the present invention, there is provided a processing apparatus using a gas, comprising: a gas processing unit for performing specific processing to a target object using the gas; and a gas supply unit for supplying the gas to the gas processing unit, wherein the gas supply unit includes a plurality of instruments for controlling gas having a plurality of gas flow control devices, a gas controlling instruments-storage vessel for storing the instruments, and a plurality of electrical parts arranged outside the storage vessel and belonging to the instruments, and the plurality of gas flow control devices are integrated with each other.

According to the second aspect of the present invention, there is provided a processing apparatus using a gas, comprising: a gas processing unit for performing specific processing to a target object using the gas; and a gas supply unit for supplying the gas to the gas processing unit, wherein the gas supply unit includes a plurality of instruments controlling gas, a gas controlling instruments-storage vessel for storing the instruments, and a plurality of electrical parts arranged outside the gas controlling instruments storage vessel and belonging to the gas instruments.

According to the third aspect of the present invention, there is provided a processing apparatus using a gas, comprising: a gas processing unit for performing specific processing to a target object using the gas; and a gas supply unit for supplying the gas to the gas processing unit, wherein the gas supply unit includes a plurality of instruments for controlling gas, a gas controlling instruments-storage vessel for storing the instruments, a plurality of electrical parts arranged outside the gas controlling instruments-storage vessel and belonging to the instruments, and an electrical parts-storage vessel for storing the plurality of electrical parts.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a perspective view showing a vertical heat treatment apparatus to which the present invention is applied;

FIG. 3 is a view showing the gas controller unit and electrical parts in the apparatus of FIG. 1;

DETAILED DESCRIPTION OF THE PREFERRED EMBODIMENTS

Figure 2:
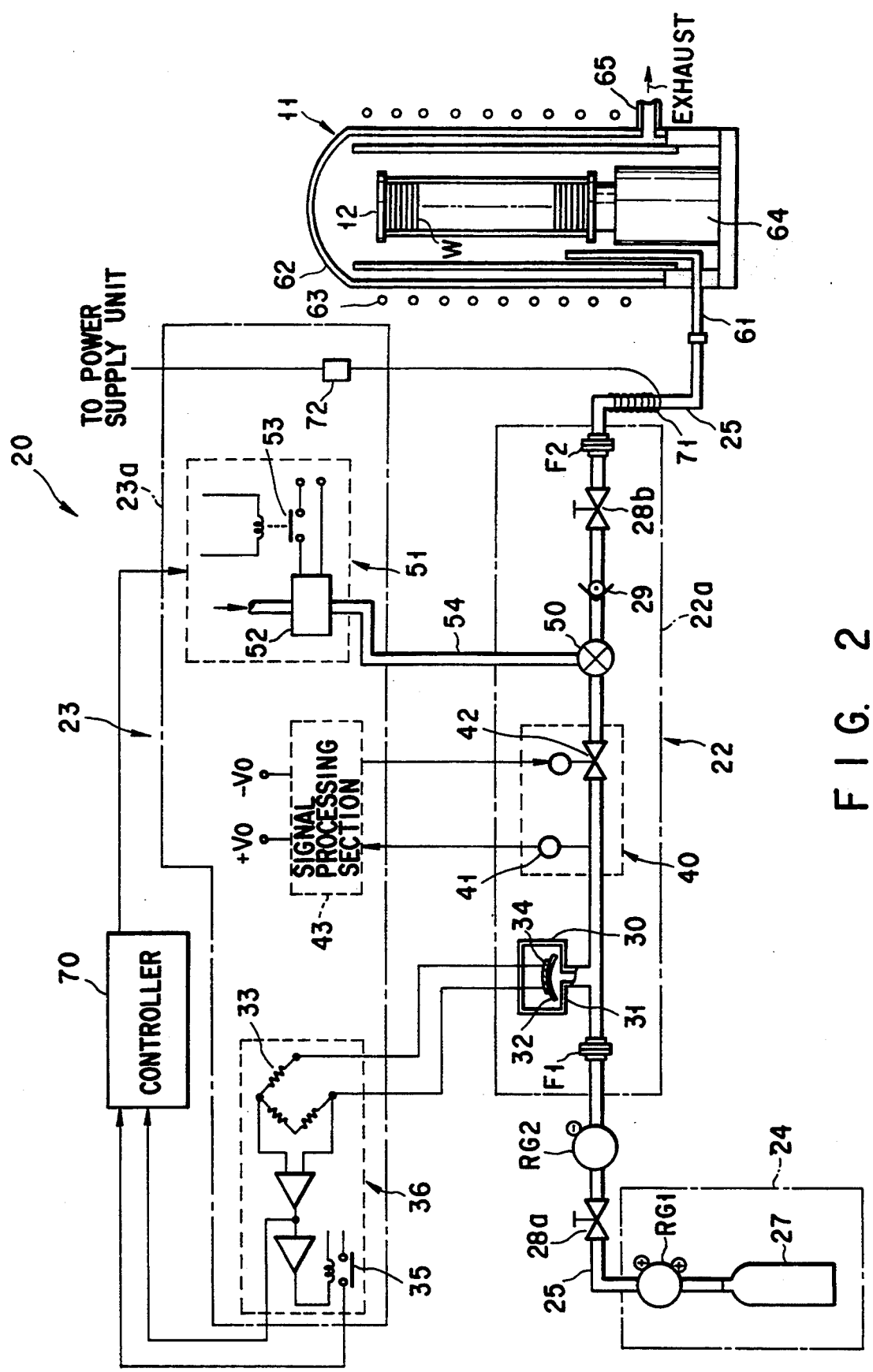
FIG. 2 is a view showing the gas supply unit in the apparatus of FIG. 1.

Preferable embodiments of the present invention will be described below with reference to the accompanying drawings.

FIG. 1 is a perspective view showing the arrangement of a vertical heat treatment apparatus for a semiconductor wafer to which the present invention is applied. This apparatus comprises a heat treatment unit 10 and a gas supply/exhaust unit 20 arranged at the back of the heat treatment unit 10.

The heat treatment unit 10 comprises a cylindrical heat treatment furnace 11 arranged substantially vertically. A boat elevator 13 for vertically moving a wafer boat 12 on which a plurality of semiconductor wafers are placed is arranged under the heat treatment furnace 11. The wafer boat 12 on which the wafers are placed is loaded/unloaded by the boat elevator 13 into/from the heat treatment furnace 11. A transfer mechanism 15 for transferring semiconductor wafers between wafer cassettes 14 and the wafer boat 12 is arranged in front of the boat elevator 13. A cassette storage mechanism 16 for storing the plurality of wafer cassettes 14 and a convey mechanism 17 for conveying the wafer cassettes 14 are arranged above the transfer mechanism 15.

The supply/exhaust unit 20 comprises an evacuation mechanism 21 for evacuating the heat treatment furnace 11, a gas source unit 24, arranged adjacent to the evacuation mechanism 21 (the gas source unit and evacuation mechanism are disposed in the compartment designated 21, 24 in FIG. 1), for storing gas sources, a gas controller unit 22 having a plurality of instruments for controlling gases such as a purge gas, a process gas, and a carrier gas supplied from the gas source unit 24 to the heat treatment furnace 11, and an electrical part unit 23 having a plurality of electrical parts for the gas controlling instruments. A process gas is supplied from the gas source unit 24 into the heat treatment furnace 11 through the gas controller unit 22 via a gas supply pipes 25 while the heat treatment furnace 11 is exhausted by the evacuation mechanism 21 through an exhaust pipe 26, so as to bring the heat treatment furnace 11 to a low-pressure atmosphere having a predetermined gas pressure. Heat treatment such as film formation processing is performed in this atmosphere.

A gas supply/exhaust unit 20 will be described below with reference to FIG. 2.

A plurality of gas bombs 27 (only one is shown in FIG. 2) are arranged in the gas source unit 24, and process gases (e.g., a hydrogen gas, an oxygen gas, a silane-based gas, and a halogen gas), a carrier gas, and a purge gas are filled in the gas bombs 27 at high-pressure states, respectively.

Each of the gas supply pipes 25 is connected to each of the gas bombs 27 through a primary pressure reducing valve RG1 for primarily reducing the pressure of a corresponding one of the high-pressure gases. Each of the gas supply pipes 25 is formed of, e.g., stainless steel, and a hand valve 28a and a secondary pressure reducing valve RG2 are inserted in each of the gas supply pipes 25. As the gas controlling instruments, e.g., a filter F1, a pressure switch 30, a mass-flow controller 40, a blocking valve 50, a check valve 29, a hand valve 28b, and a filter F2 are sequentially arranged on the downstream side of each of the gas supply pipe 25 in this order. These gas controlling instruments are stored in a casing 22a to constitute a gas controller unit 22.

On the downstream side of the gas controller unit 22, an injector 61 consisting of, e.g., quartz or stainless steel is connected to the gas supply pipe 25 through a flexible pipe (not shown) such as a Teflon tube, and this injector 61 is inserted in a reaction tube 62 of the heat treatment furnace 11 serving as a gas processing unit. The heat treatment furnace 11 comprises, e.g., the reaction tube 62 and a heater 63 arranged to surround the reaction tube 62. The wafer boat 12 on which semiconductor wafers W are placed is inserted in the reaction tube 62 such that the wafer boat 12 is placed on a heat insulating cylinder 64. A gas exhaust port 65 is formed in the reaction tube 62, and the evacuation mechanism 21 is connected to the reaction tube 62 through the exhaust pipe 26.

For example, a tape heater 71 is wound around each of the gas supply pipes 25 to pre-heat the process gases or to prevent condensation. However, for the sake of convenience, only part of the tape heater 71 is shown in FIG. 2.

Some of the gas controlling instruments are combined with electrical parts for controlling extraction of a detection signal and the gas flow rates, gas pressures, and start/stop operations of gas supply. For example, the pressure switch 30 has the following function. That is, a resistor 34 serving as a part of a Wheatstone bridge circuit 33 adheres to a pressure detection plate 32 in a case 31, distortion of the pressure detection plate 32 is detected by the Wheatstone bridge circuit 33, and the pressure detection value is output to a controller 70. In addition, when the pressure detection value exceeds a predetermined value, an alarm signal is output to the controller 70 by a relay 35. The electrical parts of the pressure switch 30 except for the resistor 34 are mounted on the substrate of a circuit unit 36.

The mass-flow controller 40 has a flow-rate detection unit 41, a flow adjustment section 42, a signal processing unit 43 for processing a detection signal from the flow-rate detection section 41 to output an operation signal to the flow adjustment section 42. This signal processing section 43 has electrical parts such as a control amplifier and is applied with a DC voltage of $\pm V_0$, e.g., $\pm 15$ V.

The blocking valve 50 is constituted to perform a blocking operation by air from an air control unit 51, and the air control unit 51 comprises a solenoid valve 52, a circuit, having a relay 53, for operating the solenoid valve 52. Note that reference numeral 54 denotes an air supply pipe.

The electrical parts such as the circuit unit 36, the signal processing section 43 of the mass-flow controller 40, and the air control unit 51 of the blocking valve 50 are stored in a casing 23a independently of the gas controller unit 22 to constitute the electrical part unit 23. In addition, a connector 72 of the tape heater 71 is also incorporated in the electrical part unit 23.

Although one gas piping system is exemplified in the above description, a large number of gas piping systems are arranged in an actual heat treatment apparatus to cope with various heat treatment processes. In addition, since the number of gas controlling instruments of each gas piping system is large, the number of gas controlling instruments in the gas controller unit 22 is very large, and the gas controller unit 22 is constituted, e.g., as shown in FIG. 3. In this gas controller unit 22, a ventilation pipe 73 on a supply side and a ventilation pipe 74 on an exhaust side are connected to the casing 22a having an airtight structure, and air is circulated in the gas controller unit 22. Therefore, the gas controller unit 22 has a gas leakage prevention structure in which, if a gas leaks in the casing 22a, the gas does not leak outside the casing 22a.

The electrical part unit 23, as shown in FIG. 3, is arranged independently of the gas controller unit 22, i.e., outside the casing 22a of the gas controller unit 22, and the electrical parts are arranged in the casing 23a. A cable 84 having a signal path for transmitting electrical signals between the electrical parts and the gas controlling instruments is connected between the units 22 and 23. A cable 85 used for receiving and transmitting an alarm signal, a detection signal, or a control signal between the electrical part unit 23 and the controller 70 is connected therebetween.

In the heat treatment apparatus arranged as described above, after a large number of wafers W placed on the wafer boat 12 are loaded in the reaction tube 62 of the heat treatment furnace 11, the pressure in the reaction tube 62 is reduced to a predetermined degree of vacuum, and the reaction tube 62 is uniformly heated to a predetermined temperature by the heater 63. A process gas from one of the gas bomb 27 of the gas source unit 24 is flown in the gas supply pipe 25. While the pressure and flow rate of the process gas are controlled by the secondary pressure reducing valve RG2 and the mass-flow controller 40, respectively, the process gas is supplied into the reaction tube 62 through the injector 61. In this manner, heat treatment processes such as an etching process, a CVD process, and a diffusion process are performed to the wafers W using the process gas. Upon completion of the heat treatment processes, the process gas is switched to a purge gas to purge the process gas from the reaction tube 62.

In the above processes, a gas leaks from, e.g., a loose connection portion in the gas controller unit 22, and sparks are produced from the contacts of the electrical parts such as the switch 35 and the relay 53 incorporated in a gas controller, or sparks are produced from a defective connection of the circuit or the defective connection of the connector 26 of the tape heater 71. In this case, as described above, since the electrical parts are arranged outside the gas controller unit 22 and separated from the leakage gas, any gas explosion or firing does not occur. As described above, when the gas controllers are stored in the casing 22a having a gas leakage prevention structure, and the electrical part unit 23 is arranged independently of the casing 22a, each electrical part need not have an airtight structure or an explosion prevention structure, thereby obtaining a compact gas supply system.

The mass-flow controller (gas flow control device) 40 serves as the principal part of the gas controller unit and occupies a large space. For this reason, when the structure and arrangement of the mass-flow controllers 40 are improved, the gas controller unit 22 can be decreased in size, thereby obtaining a further compact gas supply system.

A mass-flow controller obtained by considering the above circumstances will be described below.

Figure 4:
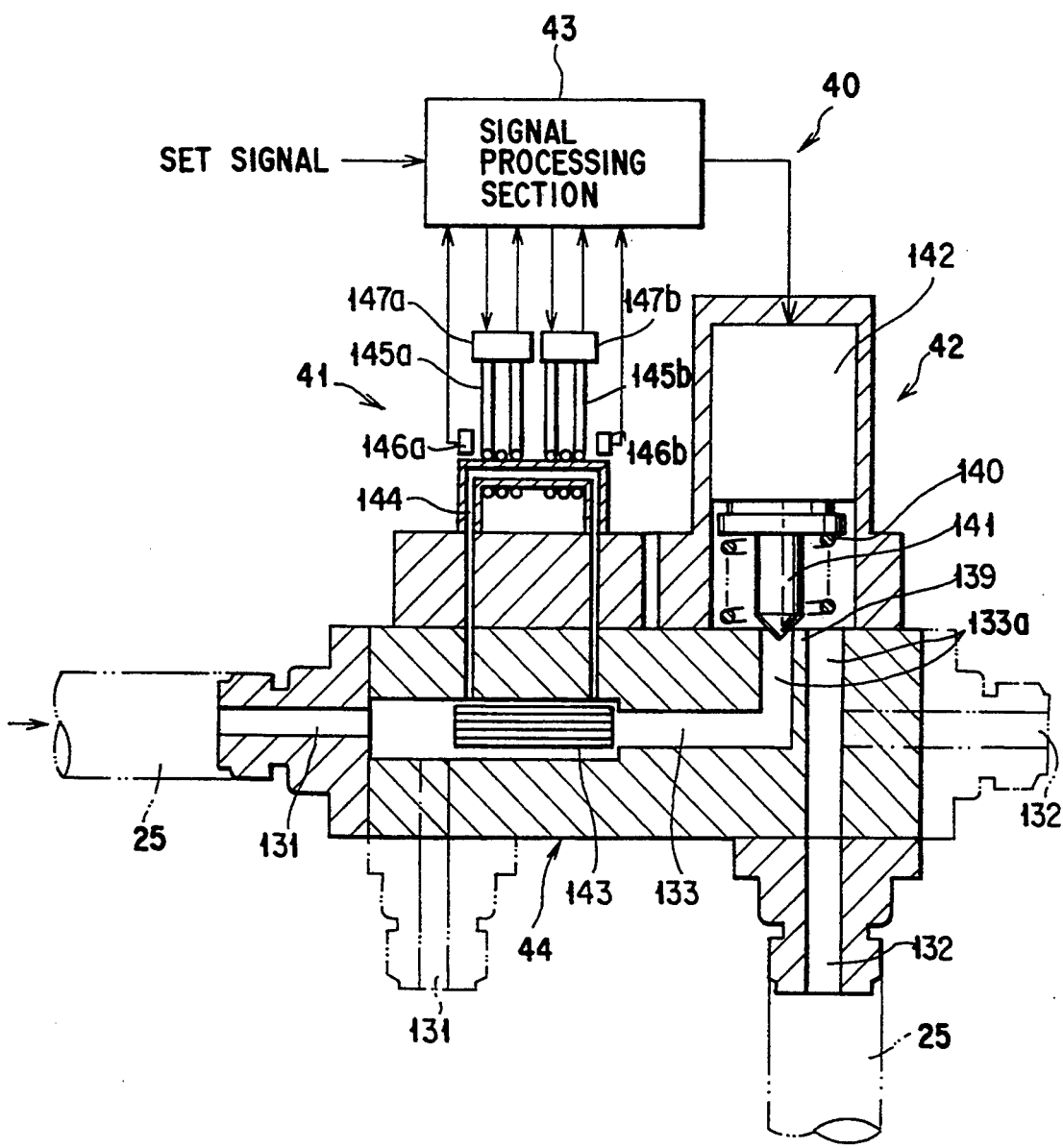
FIG. 4 is a sectional view showing an embodiment of a mass-flow controller included in the gas controller unit.

FIG. 4 is a sectional view showing this mass-flow controller. The mass-flow controller 40 comprises a base body 44 having a flow path 133 for causing a gas inlet 131 to communicate with a gas outlet 132, a gas flow adjustment section 42 serving as a flow adjustment means for controlling the flow rate of a gas in the flow path 133 of the base body 44, a flow-rate detection section 41 serving as a flow-rate detection means for detecting the flow rate of the gas in the flow path 133, and a signal processing section 43 serving as a control means for controlling the gas flow adjustment section 42 such that the flow rate of the gas is set to be a predetermined value by the flow-rate detection section 41.

In this mass-flow controller, the outlet 132 is positioned such that its gas flow direction is perpendicular to the flow path 133, and the flow path 133 and the outlet 132 are arranged to constitute an L-shaped structure. Note that the inlet 131 can also be positioned such that its gas flow direction is perpendicular to the flow path 133, and the flow path 133 and any one of the inlet 131 and the outlet 132 may be arranged to constitute an L-shaped structure. Otherwise, both the inlet 131 and the outlet 132 may be formed to constitute L-shaped structures with the flow path 33 (chain double-dashed line in FIG. 4).

The gas flow adjustment section 42 is constituted by a valve seat 139 arranged at one part of a bypass portion 133a arranged on the outlet side of the flow path 133, a valve body 141 arranged such that a compression spring 140 is interposed between the valve seat 139 and the valve body 141, and an actuator 142 for seating the valve body 141 on the valve seat 139 against the elastic force of the compression spring 140. For example, a piezoelectric element, a solenoid, or an extendible heating wire can be used as the actuator 142.

The gas flow-rate detection section 41 has a pipe 144 having an almost inverted U shape for flowing part of a gas flowing from the inlet 131 to the flow path 133. Heating wires 145a and 145b are wound on the parallel portion of the inverted U-shaped pipe 144 at predetermined intervals. Temperature sensors 146a and 146b are arranged near portions where the heating wires 145a and 145b are wound, respectively. The heating wires 145a and 145b are connected to power supplies 147a and 147b, respectively, and the power supplies 147a and 147b apply voltages to the heating wires 145a and 145b, respectively.

The power supplies 147a and 147b and the temperature sensors 146a and 146b are connected to the signal processing section 43. In the signal processing section 43, a temperature difference generated by a gas flow is detected by the temperature sensors 146a and 146b, signals are output to the power supplies 147a and 147b to apply the voltages to the heating wires 145a and 145b until the temperature difference becomes zero, and a gas flow rate is obtained by the difference between the voltages. The value of the difference between the voltages is compared with the value of a voltage corresponding to a set signal, and a control signal is output to the gas flow adjustment section 42 such that the gas flow rate is set to be a desired flow rate in accordance with the comparison result. In the gas flow adjustment section 42, the valve body 141 is driven by the control signal to adjust the sectional area of a portion corresponding to the valve seat 139 of the flow path 133, thereby setting the gas flow rate to be a predetermined value. Note that a straightening vane 143 is formed in a portion of the flow path 133 where the pipe 144 is connected to the flow path 133.

As should be apparent from the foregoing, a gas stream of a lower temperature which flows into the portion of the pipe 144 adjacent to the coil 145a is then heated by the coil 145a, with the result that a gas stream of a higher temperature flows into the portion of the pipe adjacent to the coil 145b. Further, as should be readily recognized, the temperature difference of the gas stream between the respective regions corresponding to the coils 145a and 145b is dependent upon the gas flow rate. In order to make the temperature difference (as sensed by the sensors 146a and 146b) zero, the temperature signals generated from the sensors 146a and 146b are supplied to the gas flow control unit as discussed earlier. These temperatures are compared within the control unit, and based upon the result of the comparison the output signals supplied to the power sources 147a, 147b are controlled to increase the voltage of the coil corresponding to the low temperature region (i.e., the lower of the temperatures sensed by the sensors 146a, 146b). This operation is continued until the difference between the detected temperature signals becomes zero.

Thus, since the difference in the voltage between the coils 145a and 145b is a function of the gas flow rate, the gas flow rate is calculated on the basis of the voltage difference required to make the temperature difference zero, and the control signal is supplied to the gas flow adjustment mechanism 42 based on the calculated gas flow rate.

In the mass-flow controller arranged as described above, since the inlet 131 and/or the outlet 132 is arranged perpendicularly to the flow path 133 as described above, the direction of the gas supply pipe 25 can be selected within a wide range, and the degree of freedom of arrangement of the mass-flow controller 40, the gas supply pipe 25, the filters F1, F2 the valves 28a, 28b, and the like can be increased. For this reason, the piping system of the gas controller unit 22 can be easily connected to the mass-flow controllers. In addition, when the gas supply pipe 25 is connected to the flow path 133 to constitute an L-shaped structure, the size the mass-flow controller 40 itself can be reduced, and the gas supply pipe 25 can be three-dimensionally arranged, thereby reducing the size of the gas controller unit 22.

Figure 5:
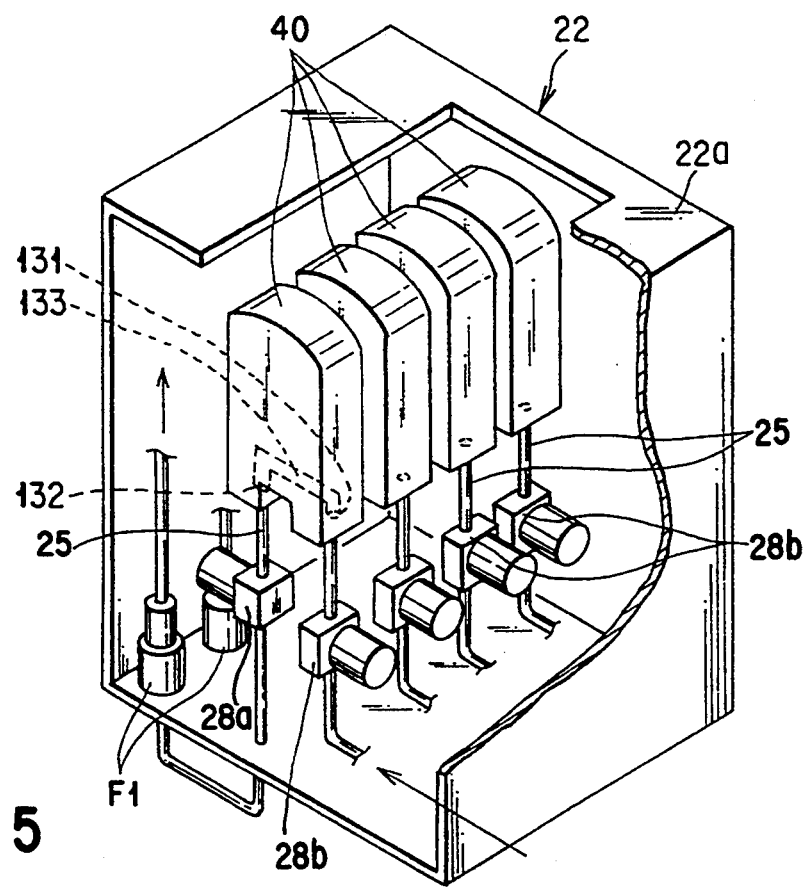
FIG. 5 is a perspective view showing another example of the gas controller unit.

In this case, the gas controller unit 22 can be arranged as shown in FIG. 5. In the gas controller unit 22, a casing 22a, and the plurality of gas supply pipes 25 corresponding in number to the types of gases to be used are arranged. The filters F1, F2, the valves 286, the mass-flow controllers 40, and the like are arranged to the gas supply pipes 25. As described above, when each of the inlets 131 and/or each of the outlets 132 is arranged perpendicularly to a corresponding one of the flow paths 133 as described above, as shown in FIG. 5 (both the inlet 131 and the outlet 132 are perpendicular to the flow path 133 in FIG. 5), the mass-flow controllers 40 can be arranged near the wall portion of the casing 22a, and maintenance of the mass-flow controllers 40 which must be subjected to maintenance and inspection more frequently than other apparatuses is advantageously facilitated.

Another embodiment of the mass-flow controller will he described below.

Figure 6:
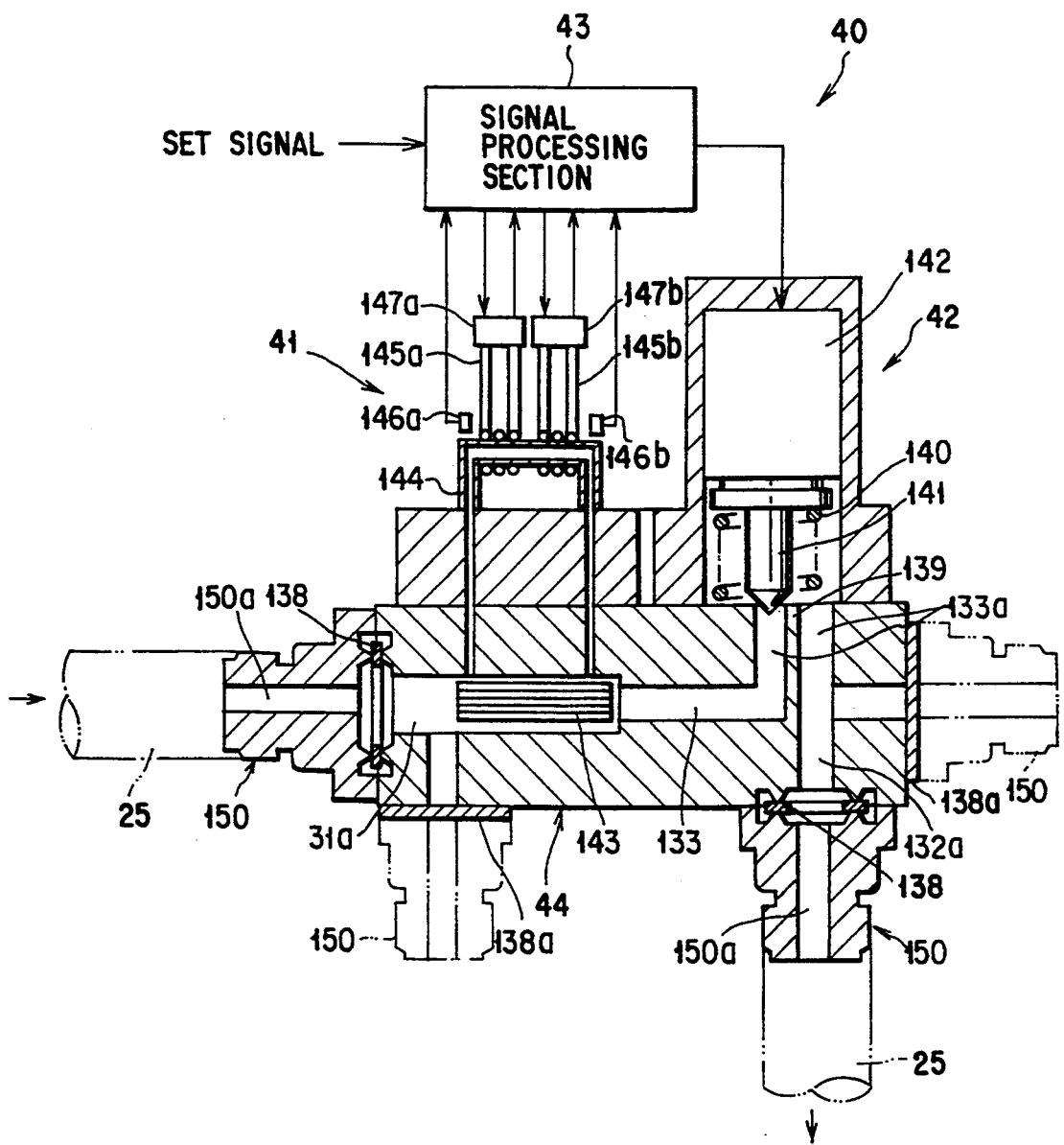
FIG. 6 is a sectional view showing another embodiment of the mass-flow controller included in the gas controller unit.

In this embodiment, a mass flow controller 40 has, as shown in FIG. 6, gas inlets 131a and 131b and outlets 132a and 132b which are selectively used. Joints 150 for connecting gas supply pipes 25 through seal members 138 such as O-rings or metal seals are detachably mounted on the inlet and outlet to be used (the inlet 131a and the outlet 132a in FIG. 6).

The inlet 131b and outlet 132b which are not used in FIG. 6 are blocked by blocking members 138a.

Other parts in FIG. 6 are arranged in the same manner as that of the mass-flow controller in FIG. 4.

When the mass-flow controller 40 is constituted as described above, the inlet and outlet for a gas can be arbitrarily selected in accordance with a request. For this reason, the degree of freedom of piping can be further increased, and the gas controller unit can be further decreased in size.

Referring to FIG. 6, the two inlets and two outlets are arranged perpendicular to each other. However, the number of inlets and the number of outlets are not limited to two, respectively, and three or more inlets and three or more outlets may be arranged. In this case, it is required only to connect joints to the inlet and outlet which are used. In addition, a plurality of inlets and a plurality of outlets need not be used. When at least a Joint is detachably mounted on the inlet and outlet ports, an effect which facilitates maintenance can be maintained.

The case wherein the joints 150 are detachably mounted on the mass-flow controllers 40, respectively, has been described above. However, a block-like Joint can also be simultaneously mounted on the plurality of mass-flow controllers 40.

Figure 7:
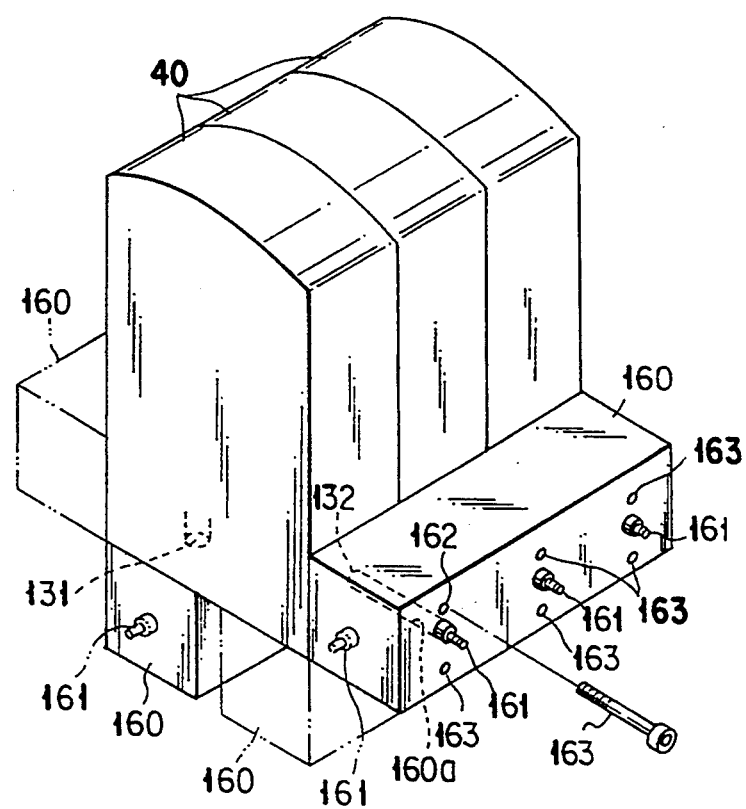
FIG. 7 is a perspective view showing a plurality of mass-flow controllers which are integrated with each other.

That is, as shown in FIG. 7, a block-like joint 160 having gas flow paths 160a and connection ports 161 of the gas supply pipes 25 communicating with the flow paths of the base bodies can he detachably mounted, through a seal member, on at least one of a gas inlet and a gas outlet arranged to each of the base bodies 44 of the mass-flow controllers 40 arranged described above. In this case, each of the connection ports 161 of the block-like joint 160 can be positioned parallelly or perpendicularly to a corresponding one of the flow paths of the base bodies, and an arbitrary piplng shape can be obtained as needed.

Figure 8A:
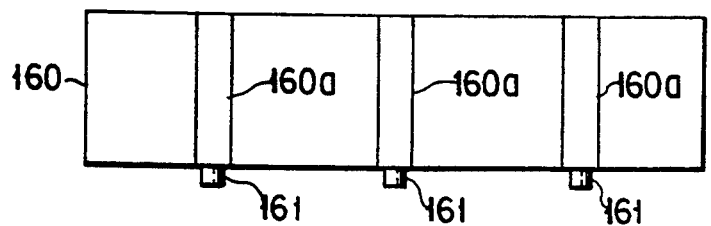
FIGS. 8A to 8D are views showing the structures of block-like joints used in the mass-flow controllers of FIG. 7.
Figure 8B:
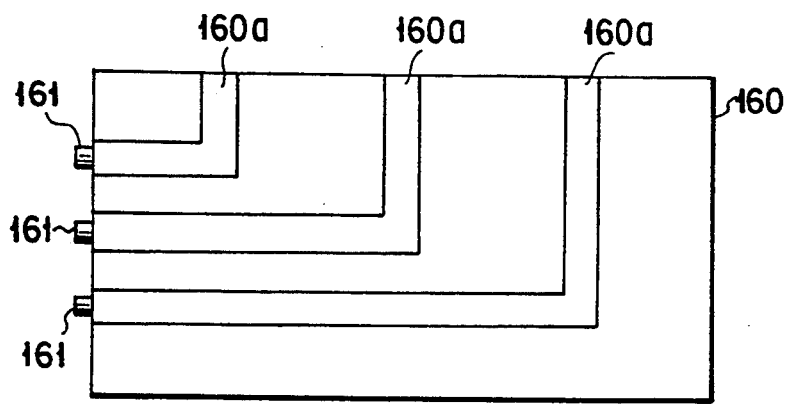
Figure 8C:
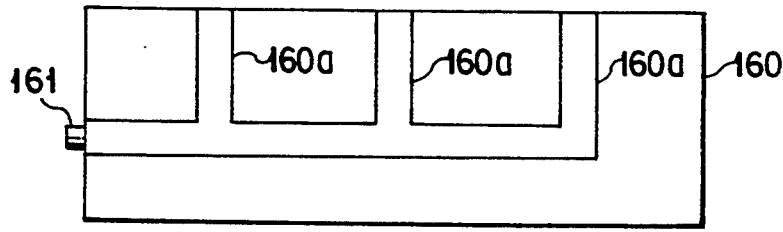
Figure 8D:
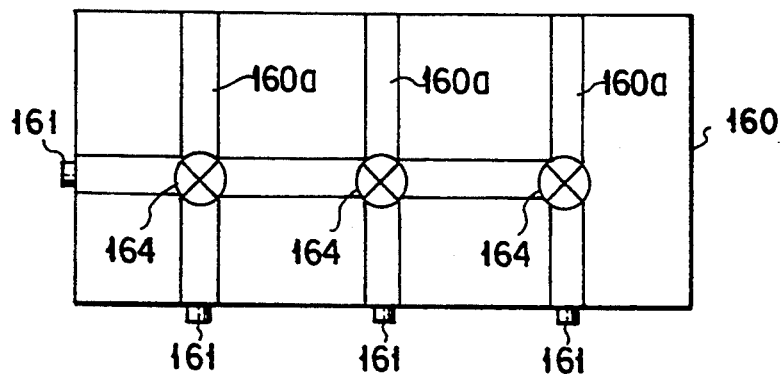

In the block-like joint 160, the gas flow paths 160a and the connection ports 161 can vary in accordance with piping systems. The structures of the gas flow paths 160a and the connection ports 161 are shown in FIGS. 8A to 8D. FIG. 8A shows an example wherein each of gas flow paths 160a is linearly arranged. FIG. 8B shows an example wherein connection ports 161 corresponding to gas flow paths 160a are arranged on a side wall of the block-like joint. FIG. 8C shows an example wherein gas flow paths 160a are merged to be connected to one connection port 161. FIG. 8D shows an example wherein the embodiments in FIGS. 8A and 8C can be selectively employed using valves 164.

Note that, in order to mount the block-like joint 160 on the base bodies 44, mounting bolts 163 respectively extending through mounting holes 162 formed in the block-like joint 160 are preferably threadably engaged in mounting holes (not shown) formed in the base bodies 44.

As described above, when the block-like joint 160 can be detachably mounted on at least one of the inlet and outlet of each of the plurality of mass-flow controllers 40, the number of parts can be reduced, and a piping operation can be easily performed. In addition, since the mass-flow controllers can be formed as a unit, the size of the gas controller unit 22 can be further reduced, and maintenance of the gas controller unit 22 can be facilitated.

Figure 9:
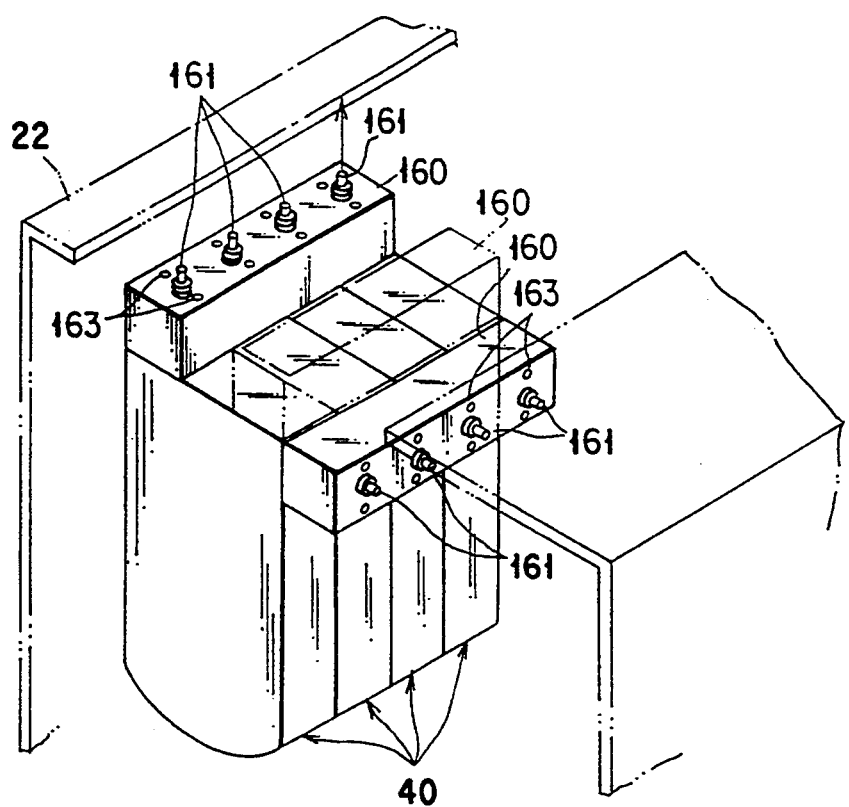
FIG. 9 is a perspective view showing a modification of the mass-flow controllers in FIG. 7.

The arrangement shape of the arrangement of the mass-flow controller 40 can he freely selected from various arrangement shapes. As shown in FIG. 9, the inlets 131 and outlets 132 may be positioned at an upper or side position, i.e., the inlets 131 and outlets 132 can be arranged at an arbitrary position.

In each of the above embodiments, although the electrical parts are arranged in the casing 23a having an airtight structure to constitute the electrical part unit 23, and the electrical parts need not be arranged as a unit. The electrical parts need only be arranged outside the casing of the gas controller unit. Gas sensors may be arranged in the units 22 and 23, respectively, so that the power supply is disconnected by an output from the gas sensors. In addition, all the gas controlling instruments are not stored in one casing, the instruments may be divided into a plurality of groups, and the instruments may be stored in casings in units of groups. The present invention can be applied not only the heat treatment apparatus but also a processing apparatus such as an etching apparatus, an ion-implantation apparatus, or a plasma CVD apparatus which uses a gas. In addition, a target object is not limited to a semiconductor wafer, and another target object such as an LCD substrate may be used.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A processing apparatus using a gas, comprising:
   a gas processing unit for performing specific processing to a target object using the gas; and
   a gas supply unit for supplying the gas to said gas processing unit;
   wherein said gas supply unit includes a plurality of instruments for controlling gas having a plurality of gas flow control devices, a gas controlling instruments-storage vessel for storing said instruments, and a plurality of electrical parts arranged outside said storage vessel and belonging to said instruments, and said plurality of gas flow control devices are integrated with each other, said gas controlling instruments-storage vessel including a casing spaced from said plurality of instruments for controlling gas, said casing having an interior within which said plurality of instruments for controlling gas are disposed, with said interior free of said plurality of electrical parts.

2. A processing apparatus using a gas, comprising:
   a gas processing unit for performing specific processing to a target object using the gas; and
   a gas supply unit for supplying the gas to said gas processing unit;
   wherein said gas supply unit includes a plurality of instruments for controlling gas having a plurality of gas flow control devices, a gas controlling instruments-storage vessel for storing said instruments, and a plurality of electrical parts arranged outside said storage vessel and belonging to said instruments, and said plurality of gas flow control devices are integrated with each other;
   wherein each of said gas flow control devices comprises a base body having a gas inlet and a gas outlet and a flow path for causing the inlet to communicate with the outlet, flow adjustment means for adjusting a flow rate of a gas in the flow path of said base body, flow-rate detection means for detecting the flow rate of the gas in the flow path, and control signal output means for outputting a flow control signal to said flow adjustment means on the basis of a detection result from said flow-rate detection means to control the flow rate of the gas to a predetermined value, the gas supply unit including a block-like joint detachably mounted to continue to at least one of the inlet and outlet of each of said base bodies and having a connection port of a piping communicating with the flow path of said base body of each of said flow control devices, and said plurality of flow control devices are integrated with each other by said block-like joints.

3. The apparatus according to claim 2, wherein said base body of each of said flow control devices further has another inlet, and said block-like joint is detachably mounted to continue to one of the inlets.

4. The apparatus according to claim 2, wherein said base body of each of said flow control devices further has another outlet, and said block-like joint is detachably mounted to continue to one of the outlets.

5. The apparatus according to claim 2, wherein in each of said flow control devices, at least one of the fluid inlet and fluid outlet of said base body is positioned such that a flow direction of the fluid at a corresponding one of the fluid inlet and fluid outlet is perpendicular to the flow path.

6. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas having a plurality of gas flow control devices, a gas controlling instruments-storage vessel for storing said instruments, and a plurality of electrical parts arranged outside said storage vessel and belonging to said instruments, and said plurality of gas flow control devices are integrated with each other;
wherein said gas controller storage vessel has an airtight structure and comprises a gas supply pipe and a gas exhaust pipe, and a gas is circulated in said gas controller storage vessel in an airtight state.

7. An apparatus according to claim 6, further comprising an electrical part storage vessel for storing said plurality of electrical parts.

8. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas, a gas controlling instruments-storage vessel for storing said instruments, and a plurality of electrical parts arranged outside said storage controller storage vessel and belong to said instruments, said gas controlling instruments-storage vessel including a casing spaced from said plurality of instruments for controlling gas, said casing having an interior within which said plurality of instruments for controlling gas are disposed, with said interior free of said plurality of electrical parts.

9. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas, a gas controlling instruments-storage vessel for storing said instruments, and a plurality of electrical parts arranged outside said gas controller storage vessel and belonging to said instruments;
wherein said gas controllers have a plurality of flow control devices, each of said flow control devices comprising a base body having a gas inlet and a gas outlet and a flow path for causing the fluid inlet to communicate with the fluid outlet; flow adjustment means for adjusting a flow rate of a gas in the flow path of said base body; flow-rate detection means for detecting the flow rate of the gas in the flow path; and a control signal output means for outputting a flow control signal to said flow adjustment means on the basis of a detection result from said flow-rate detection means to control the flow rate of the gas to a predetermined value, and at least one of the gas inlet and gas outlet of said base body being positioned such that a flow direction of the gas at a corresponding one of the gas inlet and gas outlet is perpendicular to the flow path.

10. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas, a gas controlling instruments-storage vessel for storing said instruments, and a plurality of electrical parts arranged outside said gas controller storage vessel and belonging to said instruments;
wherein said gas controlling instruments have a plurality of flow control devices, each of said flow control devices comprising a base body having a gas inlet and a gas outlet and a flow path for causing the gas inlet to communicate with the gas outlet; flow adjustment means for adjusting a flow rate of a gas in the flow path of said base body; flow-rate detection means for detecting the flow rate of the gas in the flow path; a control signal output means for outputting a flow control signal to said flow adjustment means on the basis of a detection result from said flow-rate detection means to control the flow rate of the gas to a predetermined value; and a joint detachably mounted on at least one of the inlet and outlet.

11. The apparatus according to claim 10, wherein said base body further has another inlet, and said joint is detachably mounted on one of the inlets.

12. The apparatus according to claim 10, wherein said base body further has another outlet, and said joint is detachably mounted on one of the outlets.

13. The apparatus according to claim 10, wherein at least one of the gas inlet and gas outlet of said base body is positioned such that a flow direction of the gas at a corresponding one of the gas inlet and gas outlet is perpendicular to the flow path.

14. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas, a gas controlling instruments-storage vessel for storing said instruments, and a plurality of electrical parts arranged outside said gas controller storage vessel and belonging to said instruments;
wherein said gas controlling instruments-storage vessel has an airtight structure and comprises a gas supply pipe and a gas exhaust pipe, and a gas is circulated in said storage vessel in an airtight state.

15. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas, a gas controlling instruments-storage vessel for storing said instruments, a plurality of electrical parts arranged outside said gas controlling instruments-storage vessel and belonging to said instruments, and an electrical parts-storage vessel for storing said plurality for electrical parts, said gas controlling instruments-storage vessel including a casing spaced from said plurality of instruments for controlling gas, said casing having an interior within which said plurality of instruments for controlling gas are disposed, with said interior free of said plurality of electrical parts.

16. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas, a gas controlling instruments-storage vessel for storing said instruments, a plurality of electrical parts arranged outside said gas controlling instruments-storage vessel and belonging to said instruments, and an electrical parts-storage vessel for storing said plurality of electrical parts;
wherein said gas controllers have a plurality of flow control devices, each of said flow control devices comprising a base body having a gas inlet and a gas outlet and a flow path for causing the fluid inlet to communicate with the fluid outlet; flow adjustment means for adjusting a flow rate of a gas in the flow path of said base body; flow-rate detection means for detecting the flow rate of the gas in the flow path; and a control signal output means for outputting a flow control signal to said flow adjustment means on the basis of a detection result from said flow-rate detection means to control the flow rate of the gas to a predetermined value, and at least one of the gas inlet and gas outlet of said base body being positioned such that a flow direction of the gas at a corresponding one of the gas inlet and gas outlet is perpendicular to the flow path.

17. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas, a gas controlling instruments-storage vessel for storing said instruments, a plurality of electrical parts arranged outside said gas controlling instruments-storage vessel and belonging to said instruments, and an electrical parts-storage vessel for storing said plurality of electrical parts;
wherein said gas controlling instruments have a plurality of flow control devices, each of said flow control devices comprising a base body having a gas inlet and a gas outlet and a flow path for causing the gas inlet to communicate with the gas outlet; flow adjustment means for adjusting a flow rate of a gas in the flow path of said base body; flow-rate detection means for detecting the flow rate of the gas in the flow path; a control signal output means for outputting a flow control signal to said flow adjustment means on the basis of a detection result from said flow-rate detection means to control the flow rate of the gas to a predetermined value; and a joint detachably mounted on at least one of the inlet and fluid outlet.

18. The apparatus according to claim 17, wherein said base body further has another inlet, and said joint is detachably mounted on one of the inlets.

19. The apparatus according to claim 17, wherein said base body further has another outlet, and said joint is detachably mounted on one of the outlets.

20. The apparatus according to claim 17, wherein at least one of the gas inlet and gas outlet of said base body is positioned such that a flow direction of the gas at a corresponding one of the gas inlet and gas outlet is perpendicular to the flow path.

21. A processing apparatus using a gas, comprising:
a gas processing unit for performing specific processing to a target object using the gas; and
a gas supply unit for supplying the gas to said gas processing unit;
wherein said gas supply unit includes a plurality of instruments for controlling gas, a gas controlling instruments-storage vessel for storing said instruments, a plurality of electrical parts arranged outside said gas controlling instruments-storage vessel and belonging to said instruments, and an electrical parts-storage vessel for storing said plurality of electrical parts;
wherein said gas controlling instruments-storage vessel has an airtight structure and comprises a gas supply pipe and a gas exhaust pipe, and a gas is circulated in said storage vessel in an airtight state.

* * * * *